Feb. 26, 1952  K. W. SPILLMAN  2,587,070
MULTIPLE MOLDING BY THERMOPLASTIC INJECTION
Filed Jan. 7, 1949  3 Sheets-Sheet 2

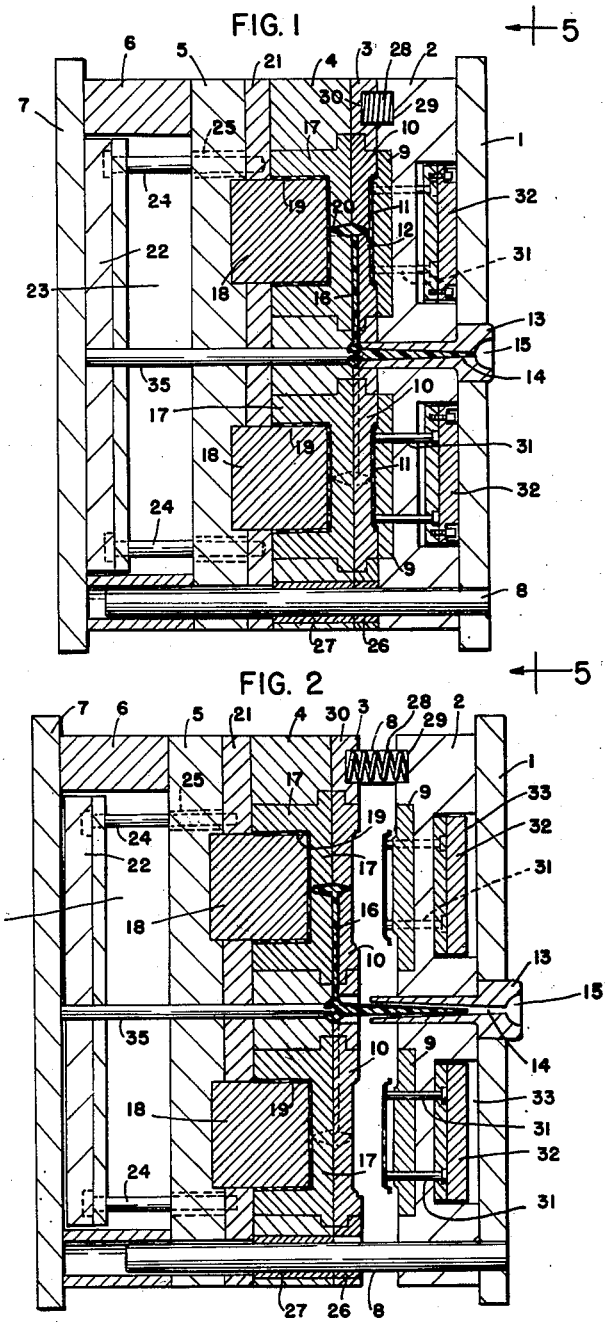

INVENTOR:
KENNETH W. SPILLMAN

Feb. 26, 1952  K. W. SPILLMAN  2,587,070
MULTIPLE MOLDING BY THERMOPLASTIC INJECTION
Filed Jan. 7, 1949  3 Sheets-Sheet 3

INVENTOR:
KENNETH W. SPILLMAN
BY
ATT'YS

Patented Feb. 26, 1952

2,587,070

UNITED STATES PATENT OFFICE 2,587,070

MULTIPLE MOLDING BY THERMOPLASTIC INJECTION

Kenneth W. Spillman, Whittier, Calif.

Application January 7, 1949, Serial No. 69,798

1 Claim. (Cl. 18—30)

This invention relates to the molding of plastics by the injection process and particularly to improvements in a means for the multiple molding of articles from thermoplastic materials.

The main objects of this invention are to provide an improved thermoplastic injection mold; to provide such a device whereby substantially the full volumetric or discharge capacity of the injection machine may be utilized during each molding cycle, as in the production of objects having a large projected area relative to their weight; to provide an improved multiple section thermoplastic injection mold; to provide an improved arrangement of such a device wherein the mold capacity may be increased in spite of the projected area limitation of the injection press; to provide an improved method for multiple molding of objects by thermoplastic injection; and to provide an improved method of injection molding of objects having a large projected area relative to the volume of the individual mold cavities.

A specific embodiment of this invention is shown in the accompanying drawings in which, Figure 1 is an axially sectioned view of an improved thermoplastic injection mold showing the mold in closed position and at completion of the injection stroke, the view being taken as on line I—I of Fig. 5.

Fig. 2 is a similar view showing the improved mold in its first position of opening and showing the articles formed in the first section of the mold being ejected.

Figure 4:
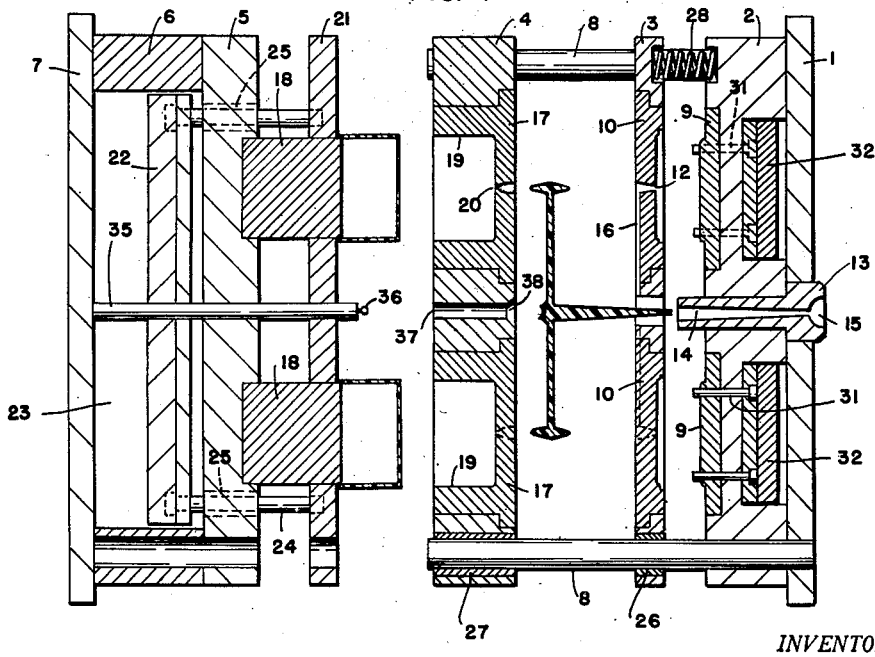
Figure 5:
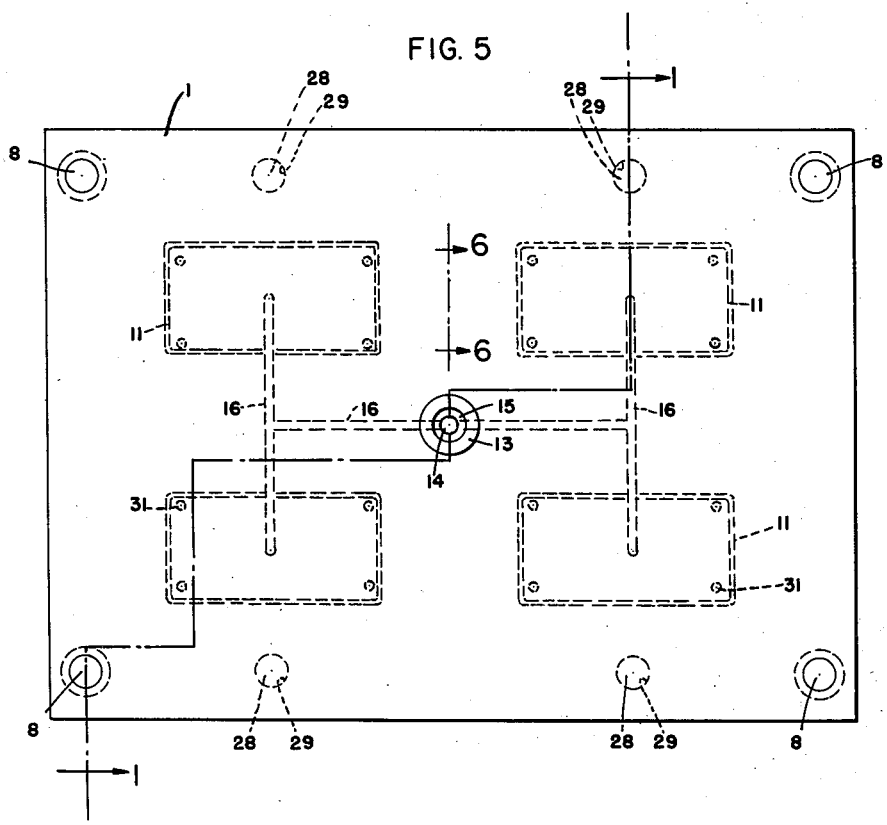

Fig. 4 is a similar view showing the mold in its fully opened position wherein the articles formed in the second section of the mold are ejected, and the material in the sprue and runners is free to be removed from between the sections of the mold, and Fig. 5 is an end view of the mold as taken from the right hand side of Fig. 1, showing one arrangement or disposition of the internal mold cavities.

In the process of injection molding, the thermoplastic compound, usually in granular form, is first heated until it reaches the liquid state at which point the compound is forced under high pressure into a relatively cool mold having mold cavities of the desired shape. This process is usually performed with an automatic or semiautomatic machine in which the granular thermoplastic compound is fed in measured quantities into a heated chamber or cylinder where the molding compound becomes plasticized and is then forced by means of a plunger through a nozzle and into the mold where it is distributed by suitably connecting channels to the several mold cavities. Upon completion of the injection stroke the thermoplastic material is rapidly cooled and solidified, following which the mold is opened for the removal of the formed articles and the waste material which fills the sprue and runners. The mold is then closed to complete the cycle of operation on the injection machine and the apparatus is ready for the commencement of the next cycle or the beginning of the next injection stroke.

In such a machine the injection pressure is very high, usually from twenty thousand to forty thousand pounds per square inch, and the capacity of the machine is limited by the ability of the mechanism to hold the mold tightly closed against the force produced by the injection pressure acting over the total projected area of the mold cavities. This means that in a structure designed to hold a mold shut during the injection cycle at full injection pressure over a projected area of the part or parts to be molded not exceeding 150 square inches, a mold having cavities in excess of 150 square inches of net projected area would "flash" or open up and spoil the parts, since the mechanism would not be powerful enough to hold the mold shut against the total pressure acting on the mold parts. In other words, the capacity of the injection machine in respect to the number of pieces that can be molded at one time is limited by the projected area size of the molded parts in relation to the maximum projected area limitations of the machine structure.

A second factor limiting the output per cycle of a thermoplastic injection machine is the volumetric capacity of the heating or plasticizing chamber, which in present-day machines can handle a sufficient volume to shoot from 16 to 32 ounces of plasticized material per cycle. This means that the number of pieces that can be molded per cycle must have a total weight, including waste material contained in the sprue and runners, which will be within the capacities of the plasticizing chamber.

In many cases the articles to be molded are relatively thin walled and have a large projected area compared to the weight of molding material required to form the articles so that the maximum projected area capacity of the molding machine will be occupied by a number of articles which will require only a fraction of the maximum weight of the molding material that can be handled by each shot or cycle of the injection mechanism, with the result that the entire molding capacity of the machine cannot be utilized. It is a purpose of the present invention to overcome this difficulty and to make possible the increased operational efficiency that will result when the full weight or volumetric capacity of the machine can be utilized during each cycle of its operation.

This is accomplished by the present invention through an improved method of utilizing the cavity capacities of the mold and by an improved construction and arrangement of the mold itself. Only the mold is herein shown and described, since the injection machine itself may be of any suitable design and does not constitute a part of the present invention. Thermoplastic injection molding machines and their construction and operation are well-known in the art, and therefore, only the improved mold need be here considered.

In the form shown in the drawings, the improved mold is made in two sections for the simultaneous molding of four box covers and four boxes on which the covers are designed to fit, the four box covers or the four box bodies having a total or net projected area within the projected area capacity of the injection machine with which the mold is to be used. The mold, however, is constructed so that the cavities for forming the covers and boxes are so aligned axially as to occupy the same projected area on a plane normal to the axis of the mold. Thus, though the total volumetric capacity of the mold cavities is greatly increased, the net projected area of the cavities is the same as though either the boxes or the box covers alone were to be formed in the mold as is done in conventional practices.

Since the sections or the walls of the box and the box cover are quite thin, the total weight of the four covers and the four boxes is within the weight capacity of molding material that can be injected in one cycle of the injection machine. If the machine is of large injection capacity, the number of mold sections can be multiplied until the full injection capacity of the machine is utilized, the only requirement or limitation being that the net projected area capacity of the machine must not be exceeded.

Figure 3:
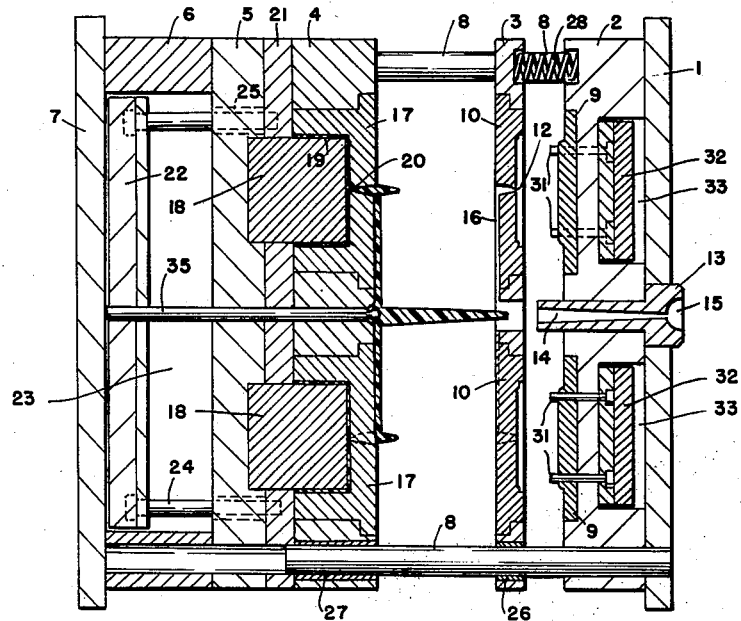
Fig. 3 is a similar view showing the mold in its second position of opening wherein the waste material in the sprue and runners is extracted from the first mold section.

As shown in the drawings, the elements comprising the mold are more or less of conventional design and include a front mold shoe or cover 1, a core retainer plate or core block 2, a pair of die blocks or cavity retainer plates 3 and 4 and a second core block or core backup plate 5. These die blocks and core blocks are in the form of rectangular plates disposed face to face in axial alignment, and are backed up by a mold shoe 6 and a back plate or rear mold shoe cover 7. The several plates or blocks comprising the mold are retained in axial alignment by means of a plurality of guide pins or leader pins 8 which are press fitted into the front core block 2 and the front mold shoe or cover 1, and as shown, the remaining plates or blocks are axially slidable on these guide pins so that the several plates may be shifted and the mold opened up, as shown in Figs. 2 to 4 inclusive.

The mold cavities for the box cover are formed in inserts 9 and 10 which are set into suitable openings in the core block 2 and the die block 3 respectively, the insert 9 having a projecting portion which functions as a core and the insert 10 having a cavity aligned with the core and so arranged that between the abutting faces of the plates 2 and 3 there will be a mold cavity or space 11 having the size and shape of the cover to be molded. The die block 3 is also provided with openings in its rearward face each of which lead through a restricted portion or gate 12 into a respective cavity 11, the opening or gate for each cavity being preferably located at substantially the center of the cavity area.

As shown in Fig. 5, the several cover cavities are disposed symmetrically about the axis of the mold and a central opening is provided in the cover plate 1 and the front core plate 2 to accommodate a sprue bushing 13 which leads from the front face of the cover 1 substantially to the rearward face of the die plate or block 3. The sprue bushing 13 is provided with a tapered central passage or sprue opening 14 which increases in size as it progresses rearwardly and the forward end of the bushing 13 is cupped as at 15 to provide a seat for the nozzle of the injection mechanism. At the rearward end of the sprue bushing the sprue passage branches laterally into runners 16 which lead laterally across the rearward face of the die plate 3 to the several gate openings 12.

The mold parts or plates 1, 2 and 3 comprise the first section of the mold. The second section of the mold comprises the plates 4 and 5 which, between them, are arranged to provide the mold cavities for forming the box. As shown, the die block 4 is provided with four inserts 17, each of which has a cavity the size and shape of the outer contour of the box to be molded and the core block or plate 5 is provided with four cores 18 which are mounted in, and carried by, the plate 5 and which extend forwardly therefrom to fit into the cavity insert of the die block 17. Each of the cores 18 is rectangular in form and is shaped to provide the inside contour for the box to be molded, the cores 18 being smaller than the cavity in the insert 17 by an amount substantially equivalent to the desired thickness of the walls of the box. The space between the core 18 and the side walls of the insert 17 constitute the mold cavity 19 in which the box is formed.

The mold cavities provided by the plates 4 and 5 are disposed so as to be axially aligned with the mold cavities 11 in the first section of the mold and the forward face of the die block 4 is provided with openings each of which leads through the gate 20 into a respective cavity 19. These openings are disposed in alignment with and open towards the plate openings leading to the mold cavities 11. Thus, each lateral branch or runner 16, leading from the sprue passage 14, terminates in a pair of opposed openings and communicates with two axially aligned mold cavities.

In accordance with the usual practice, a stripper plate 21 is disposed between the plates 4 and 5, the stripper plate having apertures fitting the cores 18 and through which the cores may slide, the arrangement being such that when the mold is opened, shifting of the stripper plate away from the core block 5 will cause the molded articles to be pushed off from the cores by the margins of the stripper plate openings.

The stripper plate 21 is actuated by means of an ejector plate 22 which in turn is slidably mounted in an interior space 23 in the rear mold shoe 6, the ejector plate 22 being connected to the stripper plate 21 by means of tie rods 24 which extend from the ejector plate 22 through suitable openings in the core block 5 to the stripper plate 21. The tie rods 24 are slidably mounted in the core block 5 in suitable bushings 25 so that by shifting the ejector plate 22 toward the front end of the mold, the stripper plate 21 will be caused to move likewise and strip the boxes off the cores 18 as shown in Fig. 4.

Ordinarily the mold is opened mechanically by the mold operating and clamping mechanism of the machine on which the mold is mounted, several of the mold plates or parts being engaged by shiftable platens, not shown, which are arranged to shift the mold parts a predetermined distance axially when the clamp pressure is released.

In such operation the first, or hot half of the mold, comprising the mold plates 1, 2, 3 and 4, is considered as the stationary half or part, and the plates 5, 6 and 7 together with the stripper plate 21 comprise the cold half or movable part of the mold. The stationary half is mounted in the molding machine with the plate 1 held in fixed position adjacent the injection mechanism so that the sprue bushing 13 is always in engagement with the injection nozzle, the nozzle seating in the cup shaped cavity 15 at the forward end of the sprue bushing. The rearward half or movable part of the mold is carried by the clamping mechanism of the injection machine and moves back and forth therewith as the mold is opened and closed in the operation of the machine.

The plates 3 and 4 are, therefore, carried on and supported by the guide pins 8, which are mounted in the stationary or fixed front end of the mold, and when the mold is opened these plates 3 and 4 slide together along the guide pins 8, riding on suitable bushings 26 and 27 respectively.

The mold operating platens, not shown, of the injection press are arranged to engage and shift the cold half, or movable part of the mold as the mold is opened and closed. However, the mold plates 2 and 3 are spring loaded apart so that as the injection press operates to open the mold, the plates 2 and 3 are automatically separated, the plate 3 pushing the plate 4 rearwardly. The springs for shifting the mold plate 3 axially relative to the mold plate 2, may be of any suitable arrangement such as a series of compression springs 28 housed in suitably aligned cavities 29 and 30 in the adjoining faces of the mold plates 2 and 3 respectively. As shown, the springs 28 are normally under compression and will act to shift the mold plate 3 rearwardly, as the clamping pressure holding the mold closed is released and the movable half of the mold is shifted in the rearward direction.

This first position of opening of the mold is shown in Fig. 2 of the drawings, and as the mold is opened, the box covers which are formed in the first section of the mold, and which normally adhere to the core portions thereof, are ejected by means of a plurality of appropriately located knock-out pins 31 which extend axially through appropriate openings in the mold plate 2 and the insert 9. The knock-out pins 31 are actuated by knock-out bars 32, mounted in transversely extending recesses 33, formed in the forward side of the mold plate 2, and these knock-out bars 32 are arranged to be actuated by the mold plate 3 as it moves away from the mold plate 2 during the opening of the mold. Such actuation is accomplished by suitable connecting means, not shown but well known in the art, which tie the mold plate 3 to the knock-out bars 32. A certain amount of end play is preferably provided in the connecting means between the mold plate 3 and the knock-out bars 32, so that actuation of the knock-out bars will not occur until the mold plate 3 has moved a predetermined distance from the plate 2 to provide space through which the ejected covers may drop.

The second position of the opening of the mold is shown in Fig. 3 and in this position the die block 4 has reached its fully opened position, which is sufficient to permit removal of the waste material formed in the sprue and runners. The pulling of the waste material from the sprue and runners is accomplished by means of a pull-out pin 35 which is attached to the rearward mold shoe cover 7 and extends axially through the mold parts, in alignment with the sprue passage 14, to the inner end of the sprue bushing 13 where a sprue puller 36, in the form of a spherical head on a pin-like projection at the end of the pull-out pin, is provided. The sprue puller 36 becomes engaged in the waste molding material at the end of the sprue 13 after injection has been completed and the molding material has solidified and therefore pulls the sprue core, together with the runners, rearwardly as the movable half of the mold is shifted during the mold opening operation. This pulling action on the sprue and runners also serves to move the die block 4 to its rearward or opened position at the end of its travel on the guide pin 8.

In the usual construction and arrangement of the pull-out pin the device is fixed in the rearward half of the mold and extends slidably through a central aperture in the stripper plate 21 and into a central opening 37 in the die block 4, the opening 37 terminating in a counterbored enlargement 38, at the forward face of the die block 4, where the sprue puller 36 becomes embedded in the solidified molding material which fills the sprue passage.

The third and final position of opening of the mold is shown in Fig. 4, and here it will be seen that the movable half of the mold has been shifted rearwardly a sufficient distance to not only fully withdraw the molded boxes from the cavities 19 of the die block 4, but also to provide sufficient space for the boxes to be stripped from the cores 18, to which they normally adhere, by action of the stripper plate 21.

As indicated in Fig. 4, the rearward movement of the movable half of the mold to its fully opened position causes the sprue puller 36 to break away from the solidified waste material contained in the sprue passage, so that the waste material becomes fully released for extraction. It will be understood, of course, that the waste material contained in the runners and in the passages leading to the mold cavities is broken away from the molded objects, at the relatively small gates, at the moment that the respective mold parts begin to separate.

As in ordinary practice, the actuation of the stripper plate 21, does not occur until near the end of the rearward movement of the movable half of the mold, at which point the ejector plate 22 is engaged by suitable members, not shown, mounted on the injection machine, so that the final rearward movement of the movable half of the mold will cause relative movement between the stripper plate and the cores 18 so that the boxes will be forced off of the cores for removal through the space between the movable half of the mold and the die block 4.

After the boxes, or the objects molded in the second section of the mold, have been released and the waste material in the sprue and runners has been removed, the mold is closed by a forward movement of the mold parts upon actuation of the clamping mechanism of the injection press, whereupon one cycle of the operation of the injection press becomes completed and the parts are ready for commencement of the next cycle of operation, wherein the mold is again charged with molding material by the injection mechanism.

It will now be apparent that by my improved method and means of thermoplastic injection molding, the capacity of the mold, for forming objects of relatively small weight compared to their projected areas, can be increased up to the full capacity of the injection mechanism so that the maximum amount of molding compound can be injected during each cycle of operation of the injection press.

Since the mold cavities are arranged in layers, the capacity of the mold can be greatly increased without exceeding the projected area capacity of the injection press, because the force tending to open the mold during the injection stroke is no greater than that acting over the surface of the cavities in the mold section having the largest projected area. Thus, the only limitation insofar as force is concerned is that the sum of the projected areas of all the parts in any one layer does not exceed the rated projected area capacity of the injection press. So long as the sum of projected areas of the cavities in any other section or layer of the mold is equal to, or less than, the maximum projected area capacity of the press, the number of mold cavities can be multiplied until the weight of the material required to fill the mold cavities is equal to the injection capacity of the machine during a single cycle.

In the form shown in the drawings, the mold cavities, for the covers formed in the first section of the mold and the boxes formed in the second section of the mold, are of substantially equal projected areas and the cavities in the two sections are aligned with each other axially of the mold so that the net projected area of the cavities in one section is not affected by the areas of the cavities in the second section of the mold.

It will be understood, however, that it is not necessary for the part or group of parts in one layer to have the same total projected area as the part or group of parts in the next layer since the net effective projected area, tending to open the mold during the injection process, is the linear projected area of all of the parts or cavities within the mold when all are projected to a single plane lying normal to the axis of the mold. Thus, if the sum of the projected areas of the parts formed in one section of the mold is equal to the maximum projected area capacity of the injection press, the parts to be formed in the second section of the mold may be of any size so long as their projected areas will lie within the projections of the areas of the first section of the mold.

The term "net projected area" as used herein is intended to mean the total space or area on a single plane that will be occupied by all of the cavities in the mold when projected to that plane.

Although but one specific embodiment of this invention is herein shown and described, it will be understood that details of the construction shown may be altered or omitted without departing from the spirit of this invention as defined by the following claim.

I claim:

An injection mold comprising a pair of axially shiftable mold sections mounted face to face in axial alignment and adapted to be clamped together in an injection press, each section having a pair of axially separable plates disposed normal to its axis and in face to face abutment, each pair of plates having a plurality of mold cavities formed between their abutting faces and the mold cavities of one section being disposed relative to the cavities of the next section so that the axially projected areas of the corresponding cavities of both sections will be substantially in common, the adjacent plates of said sections having gates leading axially from the respective mold cavities to the mutually facing section surfaces, and a sprue extending axially through one section to the other, one of said mutually facing section surfaces having branch passages formed therein to connect said mold cavity gates with said sprue.

KENNETH W. SPILLMAN.

REFERENCES CITED

The following references are of record in the file of this patent:

UNITED STATES PATENTS

| Number | Name | Date |
| --- | --- | --- |
| 644,425 | Harrison | Feb. 27, 1900 |
| 1,936,141 | Pack | Nov. 21, 1933 |
| 2,259,781 | Shaw et al. | Oct. 21, 1941 |
| 2,262,615 | Lester | Nov. 11, 1941 |
| 2,368,818 | Fleenor | Feb. 6, 1945 |
| 2,476,558 | Moxness | July 19, 1949 |